(12) United States Patent
Kim et al.

(10) Patent No.: US 8,958,031 B2
(45) Date of Patent: Feb. 17, 2015

(54) LIQUID CRYSTAL DISPLAY

(75) Inventors: Wan-Sang Kim, Seoul (KR); Sanggil Kwak, Cheonan-si (KR); Wonju Kim, Asan-si (KR)

(73) Assignee: Samsung Display Co., Ltd., Yongin, Gyeonggi-Do (KR)

( * ) Notice: Subject to any disclaimer, the term of this patent is extended or adjusted under 35 U.S.C. 154(b) by 199 days.

(21) Appl. No.: 13/602,425

(22) Filed: Sep. 4, 2012

(65) Prior Publication Data

US 2013/0258246 A1 Oct. 3, 2013

(30) Foreign Application Priority Data

Mar. 29, 2012 (KR) ........................ 10-2012-0032513

(51) Int. Cl.
*G02F 1/1335* (2006.01)

(52) U.S. Cl.
USPC .............................................. 349/65; 349/74

(58) Field of Classification Search
USPC ............................. 349/74, 65, 149
See application file for complete search history.

(56) References Cited

U.S. PATENT DOCUMENTS

| | | | |
|---|---|---|---|
| 6,853,418 B2 | 2/2005 | Suzuki et al. | |
| 6,882,380 B2 * | 4/2005 | Yu et al. | 349/61 |
| 7,301,591 B2 | 11/2007 | Akiyama | |
| 7,342,624 B2 | 3/2008 | Kim et al. | |
| 7,599,021 B2 | 10/2009 | Tsuda et al. | |
| 7,855,764 B2 * | 12/2010 | Okuda | 349/65 |
| 8,373,823 B2 * | 2/2013 | Heo | 349/65 |
| 2006/0007701 A1 | 1/2006 | Schoellmann et al. | |
| 2006/0050199 A1 | 3/2006 | Hsu et al. | |
| 2010/0202105 A1 | 8/2010 | Chang | |

FOREIGN PATENT DOCUMENTS

| | | |
|---|---|---|
| KR | 1019980003687 | 3/1998 |
| KR | 1020070098225 | 10/2007 |
| KR | 1020080094286 | 10/2008 |
| KR | 1020110077333 | 7/2011 |
| KR | 1020110106499 | 9/2011 |
| KR | 1020110106616 | 9/2011 |

\* cited by examiner

*Primary Examiner* — James Dudek
(74) *Attorney, Agent, or Firm* — F. Chau & Associates, LLC

(57) ABSTRACT

A liquid crystal display includes a light guide plate, a light source, first and second liquid crystal display panels, a main circuit board, and a heat discharging member. The light guide plate includes first and second exiting surfaces, and a side surface extending from the first and second exiting surfaces. The light source faces the side surface and provides light to the side surface. The first and second liquid crystal display panels receive the light exiting from the first and second exiting surfaces, respectively. The main circuit board applies an electrical signal to at least one of the first and second liquid crystal display panels. The light source and the main circuit board are mounted on the heat discharging member, and the heat discharging member discharges heat generated by the light source.

23 Claims, 10 Drawing Sheets

LIQUID CRYSTAL DISPLAY

CROSS-REFERENCE TO RELATED APPLICATION

This application claims priority under 35 U.S.C. §119 to Korean Patent Application No. 10-2012-0032513, filed on Mar. 29, 2012, the disclosure of which is incorporated by reference herein in its entirety.

TECHNICAL FIELD

The present invention relates to a liquid crystal display. More particularly, the present invention relates to a dual liquid crystal display capable of displaying an image in two opposite directions.

DISCUSSION OF THE RELATED ART

A standard liquid crystal display displays an image in one direction, and includes a backlight unit that outputs light, a liquid crystal display panel that receives the light from the backlight unit and displays the image, a main circuit board electrically connected to the liquid crystal display panel, and a protective frame that accommodates the backlight unit, the liquid crystal display panel, and the main circuit board. In addition, a supporting member that mounts the liquid crystal display panel and the backlight unit in their proper positions is included in the protective frame.

A dual liquid crystal display displays an image in two opposite directions. A dual liquid crystal display includes two liquid crystal displays, each of which displays an image in one direction. As a result of having two liquid crystal displays, a dual liquid crystal display may be thicker than a standard liquid crystal display, and may have a high manufacturing cost relative to a standard liquid crystal display. Further, a dual liquid crystal display may generate more heat than a standard liquid crystal display, and may require a specially designed supporting structure to accommodate the additional components of the display.

SUMMARY

Exemplary embodiments of the present invention provide a liquid crystal display having improved heat discharging ability and reduced manufacturing cost.

Exemplary embodiments of the present invention include a liquid crystal display having a light guide plate, a light source providing light to the light guide plate, first and second liquid crystal display panels arranged facing each other and interposing the light guide plate therebetween, first and second main circuit boards applying electrical signals to the first and second liquid crystal display panels, respectively, and a heat discharging member.

The light guide plate may include a first exiting surface, a second exiting surface facing the first exiting surface, and an incident surface to which the light from the light source is incident. The first liquid crystal display panel receives the light exiting from the first exiting surface to generate an image, and the second liquid crystal display panel receives the light exiting from the second exiting surface to generate an image.

The heat discharging member discharges heat generated from the light source, the first and second main circuit boards, and the light source, and the light source and the first and second main circuit boards may be mounted on the heat discharging member.

The heat discharging member may include a first surface facing the light source, a second surface extending from the first surface, and a third surface extending from the first surface. The light source is mounted on the first surface, the first main circuit board is mounted on the second surface, and the second main circuit board is mounted on the third surface.

The heat discharging member may further include a vertical portion including the first surface, a first horizontal portion extending from the vertical portion and including the second surface, and a second horizontal portion extending from the vertical portion and including the third surface. The first horizontal portion and the second horizontal portion are spaced apart from each other and face each other.

Each of the first main circuit board and the second main circuit board may include a first through-hole, and the heat discharging member may further include at least one first protruding portion inserted into the first through-hole of the first main circuit board and at least one second protruding portion inserted into the second through-hole of the second main circuit board.

The heat discharging member may further include a first coupling hole penetrating the first protruding portion in a longitudinal direction of the first protruding portion, and the first protective member may further include a third coupling hole corresponding to the first coupling hole. A fixing member, such as, for example, a bolt, may be inserted into the third coupling hole and the first coupling hole.

Exemplary embodiments of the present invention provide a liquid crystal display further including a first supporting member that covers a portion of the first exiting surface and a portion of the second surface, and a second supporting member that covers a portion of the second exiting surface and a portion of the third surface, and is coupled to the second supporting member. The first supporting member may have substantially the same shape as the second supporting member.

Exemplary embodiments of the present invention provide a liquid crystal display including a light source that emits a light, a light guide plate, two liquid crystal display panels, a supporting frame, a protective frame, a main circuit board, and a heat discharging member on which the light source and the main circuit board are mounted.

The supporting frame may cover a portion of the light guide plate and a portion of the heat discharging member, and supports the two liquid crystal display panels. The protective frame accommodates the two liquid crystal display panels and the supporting frame.

The liquid crystal display may further include an optical sheet that may improve an optical property of the light exiting from the light guide plate. The optical sheet is fixed onto the exiting surface of the light guide plate by the supporting frame.

According to the exemplary embodiments described above, the liquid crystal display provides the light to the first and second liquid crystal display panels using one light guide plate. Utilization of a single light guide plate may result in a liquid crystal display having a reduced thickness.

In addition, since the first and second main circuit boards are not overlapped with the light guide plate or the first and second liquid crystal display panels when viewed in a plan view, the thickness of the liquid crystal display may be further reduced.

In addition, the heat discharging member may discharge the heat generated by the first and second main circuit boards and the light source, resulting in an improved heat discharging ability of the liquid crystal display.

Further, since the first supporting member has substantially the same shape as that of the second supporting member, the manufacturing cost of the supporting frame may be reduced.

According to an exemplary embodiment of the present invention, a liquid crystal display includes a light guide plate, a light source, first and second liquid crystal display panels, a first main circuit board, and a heat discharging member. The light guide plate includes a first exiting surface and a second exiting surface facing the first exiting surface, and a side surface extending from the first exiting surface to the second exiting surface. The light source faces the side surface, and is configured to provide a light to the side surface. The first liquid crystal display panel is configured to receive the light exiting from the first exiting surface, and the second liquid crystal display panel is configured to receive the light exiting from the second exiting surface. The first main circuit board is configured to apply an electrical signal to at least one of the first and second liquid crystal displays. The heat discharging member is configured to discharge heat generated by the light source. The light source and the first main circuit board are mounted on the heat discharging member.

According to an exemplary embodiment of the present invention, a liquid crystal display includes a light source, a light guide plate, first and second liquid crystal display panels, a main circuit board, a heat discharging member, a supporting frame, and a protective frame. The light source is configured to emit a light. The light guide plate includes a first exiting surface and a second exiting surface, and is configured to output the light through the first exiting surface and the second exiting surface. The first liquid crystal display panel faces the first exiting surface, and the second liquid crystal display panel faces the second exiting surface. The light guide plate is disposed between the first and second liquid crystal display panels. The main circuit board is configured to apply an electrical signal to the first and second liquid crystal display panels. The heat discharging member is configured to discharge heat generated by the light source and the main circuit board. The light source and the main circuit board are mounted on the heat discharging member. The supporting frame covers a portion of the light guide plate and a portion of the heat discharging member, and supports the first and second liquid crystal display panels. The protective frame is configured to accommodate the first liquid crystal display panel, the second liquid crystal display panel, and the supporting frame.

According to an exemplary embodiment of the present invention, a heat discharging member of a liquid crystal display includes first through third surfaces. The second surface extends from the first surface in a first plane, and the third surface extends from the first surface in a second plane substantially parallel to the first plane. The first surface is configured to receive a light source of the liquid crystal display and discharge heat generated by the light source in a first direction, the second surface is configured to receive a first main circuit board corresponding to a first liquid crystal display panel of the liquid crystal display and discharge heat generated by the first main circuit board in a second direction, and the third surface is configured to receive a second main circuit board corresponding to a second liquid crystal display panel of the liquid crystal display and discharge heat generated by the second main circuit board in a third direction.

BRIEF DESCRIPTION OF THE DRAWINGS

The above and other features of the present invention will become more apparent by describing in detail exemplary embodiments thereof with reference to the accompanying drawings, in which.

DETAILED DESCRIPTION OF THE EXEMPLARY EMBODIMENTS

It will be understood that when an element or layer is referred to as being "on", "connected to" or "coupled to" another element or layer, it can be directly on, connected or coupled to the other element or layer or intervening elements or layers may be present. Like numbers may refer to like elements throughout. As used herein, the term "and/or" includes any and all combinations of one or more of the associated listed items.

As used herein, the singular forms, "a", "an" and "the" are intended to include the plural forms as well, unless the context clearly indicates otherwise.

Hereinafter, exemplary embodiments of the present invention will be described with reference to the accompanying drawings.

Figure 1:
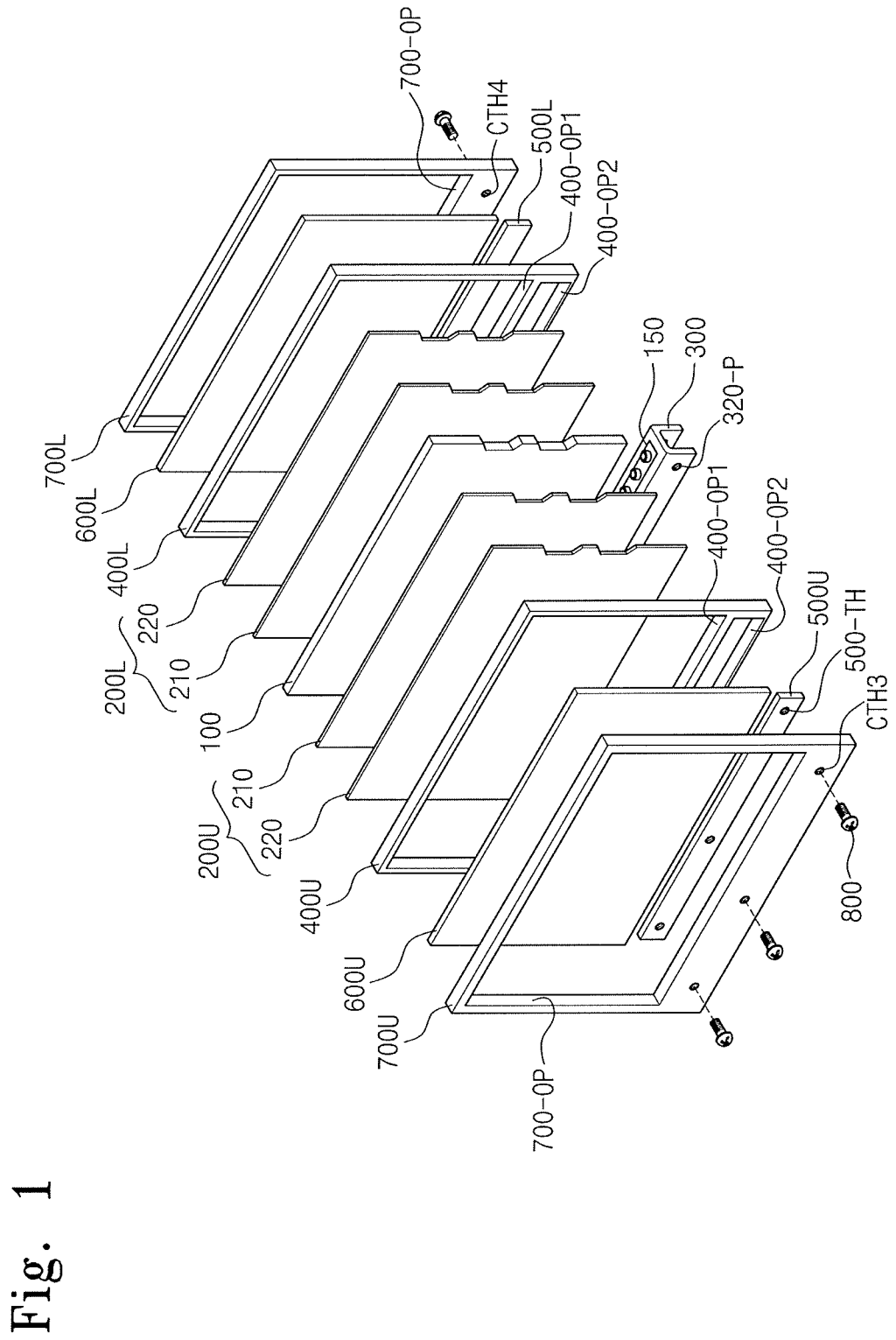
FIG. 1 is an exploded perspective view showing a liquid crystal display, according to an exemplary embodiment of the present invention.

FIG. 1 is an exploded perspective view showing a liquid crystal display, according to an exemplary embodiment of the present invention.

Referring to FIG. 1, a liquid crystal display includes a light guide plate 100, a light source 150, a first optical member 200U, a second optical member 200L, a heat discharging member 300, a first supporting member 400U, a second supporting member 400L, a first main circuit board 500U, a second main circuit board 500L, a first liquid crystal display panel 600U, a second liquid crystal display panel 600L, a first protective member 700U, and a second protective member 700L.

The light guide plate 100 receives light emitted from the light source 150 and changes an optical path of the light. The light exiting from the light guide plate 100 travels in one direction towards the first liquid crystal display panel 600U, and another direction towards the second liquid crystal display panel 600L. The light guide plate 100 may be formed of, for example, a plastic material such as polyethylene terephthalate, polyacrylate, polyethylene, polycarbonate, or polyester.

The optical members 200U and 200L receive the light exiting from the light guide plate 100. The optical members 200U and 200L may improve optical properties of the light such as, for example, the brightness and uniformity of the light. As a result, the display quality of images displayed on the liquid crystal display panels 600U and 600L may be improved.

In the exemplary embodiment shown in FIG. 1, the optical members 200U and 200L include a prism sheet 210 and a diffusion sheet 220, however, the configuration of the optical members 200U and 200L is not limited thereto. For example, according to exemplary embodiments of the present invention, one or both of the optical members 200U and 200L may not include the prism sheet 210 and/or the diffusion sheet 220. The prism sheet 210 includes a plurality of prism patterns extending in one direction, and condenses the light exiting from the light guide plate 100. The diffusion sheet 220 diffuses the condensed light.

The heat discharging member 300 discharges heat generated by the liquid crystal display. For example, the heat discharging member 300 may discharge the heat generated by the light source 150 and the main circuit boards 500U and 500L. The heat discharging member 300 is formed of a material having high corrosion resistance and high heat conductivity, such as, for example, aluminum.

The supporting members 400U and 400L are coupled to each other and form a supporting frame. The supporting frame applies pressure on the light guide plate 100 and the optical members 200U and 200L. The light guide plate 100 and the optical members 200U and 200L are fixed between the supporting members 400U and 400L as a result of the pressure applied by the supporting frame.

In addition, the supporting frame supports the liquid crystal display panels 600U and 600L. The supporting members 400U and 400L may include, for example, a metal material or a plastic material.

The main circuit boards 500U and 500L apply electrical signals to the liquid crystal display panels 600U and 600L, respectively. Each of the main circuit boards 500U and 500L may be, for example, a multi-layer substrate having an insulating layer and a circuit layer that are repeatedly stacked on one another. In other exemplary embodiments, each of the main circuit boards 500U and 500L may be a single-layer substrate. In an exemplary embodiment, a liquid crystal display may include a single main circuit board that applies electrical signals to both the first liquid crystal display panel 600U and the second liquid crystal display panel 600L.

In addition, each of the main circuit boards 500U and 500L includes a driving circuit. For example, in an exemplary embodiment, each of the main circuit boards 500U and 500L includes a timing controller mounted thereon which receives image data and control signals from an external source, and outputs a gate control signal and a data control signal. Further, each of the main circuit boards 500U and 500L may include a plurality of active and passive devices mounted thereon.

The liquid crystal display panels 600U and 600L respectively display images using the light provided from the optical members 200U and 200L.

Each of the liquid crystal display panels 600U and 600L includes a first substrate, a second substrate facing the first substrate, and a liquid crystal layer disposed between the first substrate and the second substrate. Two electrode layers insulated from each other are disposed between the first and second substrates.

When an electric field is formed between the electrode layers, liquid crystal molecules in the liquid crystal layer are realigned. The light incident to the liquid crystal display panels 600U and 600L either passes through or is blocked at the liquid crystal display panels 600U and 600L in accordance with the arrangement of the liquid crystal molecules of the liquid crystal layer. In addition, each of the liquid crystal display panels 600U and 600L includes a first polarizing plate disposed on the first substrate and a second polarizing plate disposed on the second substrate.

The liquid crystal display panels 600U and 600L are electrically connected to the main circuit boards 500U and 500L, respectively, through a flexible circuit board. The flexible circuit board may be, for example, a tape carrier package (TCP) on which a driver circuit is mounted.

The protective members 700U and 700L are coupled to each other and form a protective frame, which protects the components described above. For example, the protective frame protects edges and side portions of the components described above. The protective members 700U and 700L include first openings 700-OP that expose the respective display screens of the liquid crystal display panels 600U and 600L. The protective members 700U and 700L may include, for example, metal or plastic.

Figure 2:
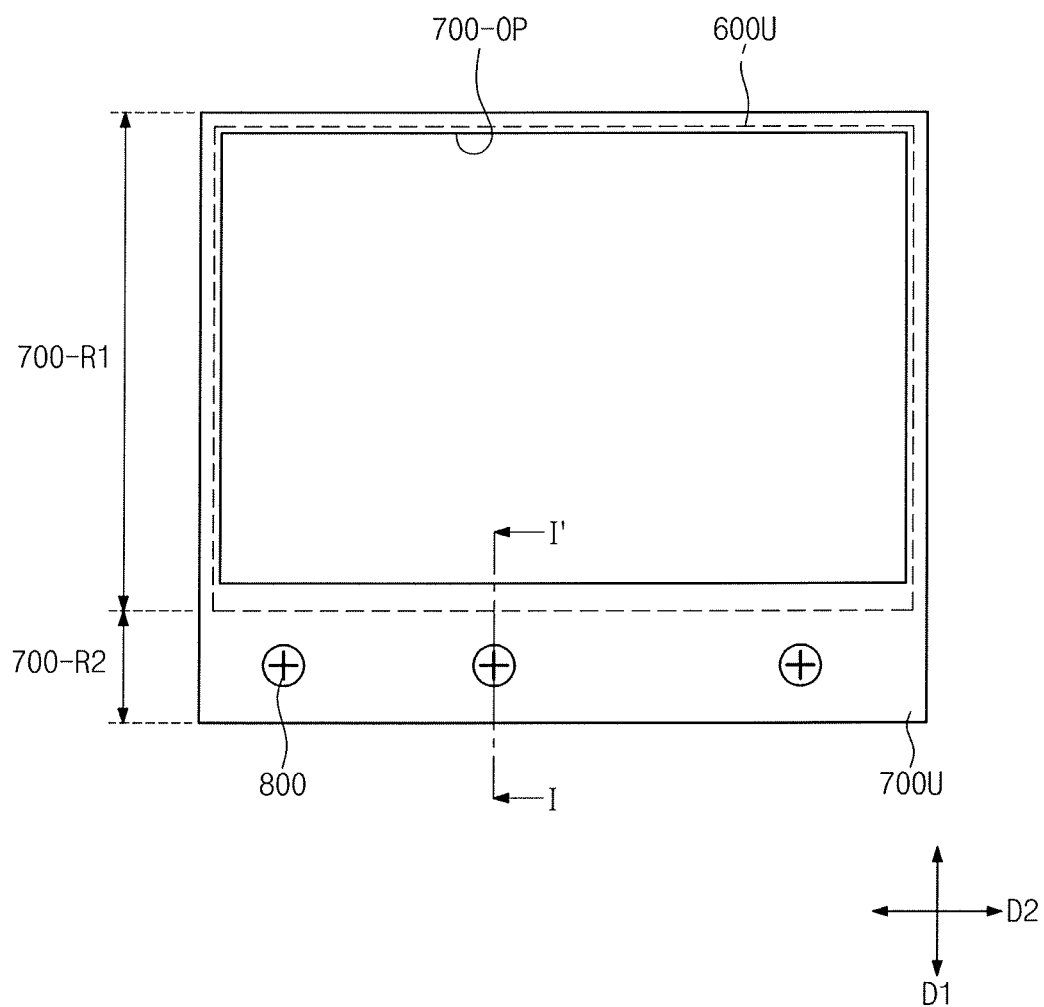
FIG. 2 is a top view showing the liquid crystal display shown in FIG. 1, according to an exemplary embodiment of the present invention.
Figure 3:
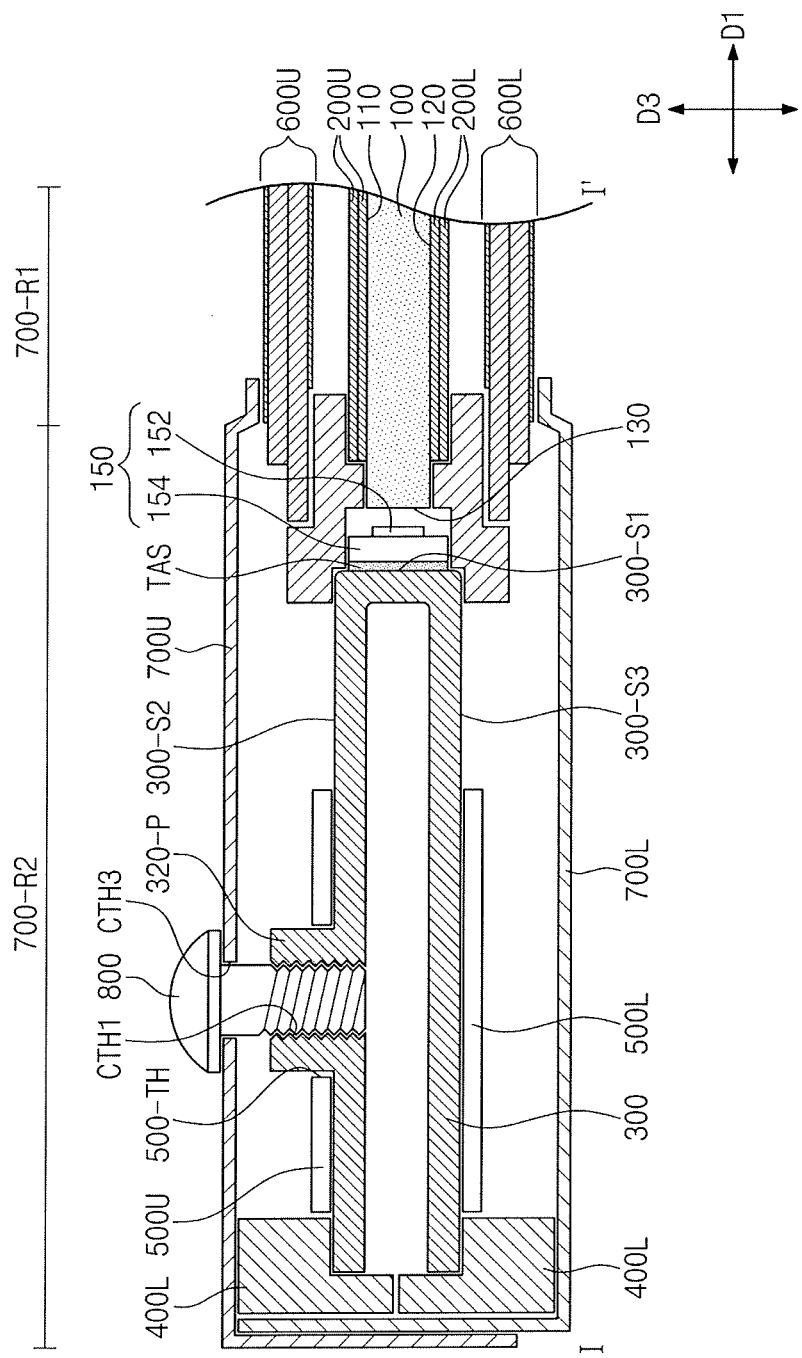
FIG. 3 is a cross-sectional view taken along line I-I' of FIG. 2.

FIG. 2 is a top view showing the liquid crystal display shown in FIG. 1, according to an exemplary embodiment. FIG. 3 is a cross-sectional view taken along line I-I' of FIG. 2.

Referring to FIG. 2, the liquid crystal display has a rectangular shape when viewed in a plan view. FIG. 2 shows the first protective member 700U. The first liquid crystal display panel 600U is represented by a dotted line.

The first protective member 700U includes a first region 700-R1 that covers a portion of the first liquid crystal display panel 600U, and a second region 700-R2 adjacent to the first region 700-R1. The first opening 700-OP is positioned in the first region 700-R1, and the display screen of the first liquid crystal display panel 600U is exposed through the first opening 700-OP. The first region 700-R1 of the first protective member 700U covers an edge of the first liquid crystal display panel 600U. The second region 700-R2 of the first protective member 700U covers the heat discharging member 300 and the first main circuit board 500U.

The rear surface of the liquid crystal display has the same shape as that shown in FIG. 2. For example, the second protective member 700L includes a first region 700-R1 that covers a portion of the second liquid crystal display panel 600L, and a second region 700-R2 adjacent to the first region 700-R1.

As shown in FIG. 3, the light guide plate 100 is disposed at a center portion of the liquid crystal display in a third direction D3, and thus, an upper configuration of the liquid crystal display is substantially the same as a lower configuration of the liquid crystal display with reference to the light guide plate 100. The thickness of the liquid crystal display corresponds to the third direction D3.

The light guide plate 100 includes a first exiting surface 110, a second exiting surface 120 facing the first exiting surface 110, and a plurality of side surfaces connecting the first exiting surface 110 and the second exiting surface 120. For example, when the light guide plate 100 has a rectangular shape in a plan view, the light guide plate 100 may include four side surfaces.

Among the side surfaces, a side surface to which the light from the light source 150 is incident is defined as an incident surface. FIG. 3 shows one incident surface 130 extending in a horizontal direction D2, as shown in FIG. 2.

The light exiting from the first exiting surface 110 travels to the first liquid crystal display panel 600U disposed at the upper portion of the light guide plate 100, and the light exiting from the second exiting surface 120 travels to the second liquid crystal display panel 600L disposed at the lower portion of the light guide plate 100.

The light source 150 includes a light emitting device 152, such as, for example, an organic light emitting diode, and a light source circuit board 154 that applies an electrical signal to the light emitting device 152. The light source 150 is extended in the horizontal direction D2 along the incident surface 130.

In an exemplary embodiment, the light source 150 may include a plurality of light emitting devices 152, and the light emitting devices 152 may be connected to each other in series or parallel. The light emitting devices 152 are mounted on a surface of the light source circuit board 154.

The light source 150, the first main circuit board 500U, and the second main circuit board 500L are mounted on the heat discharging member 300, and the heat generated from the light source 150, the first main circuit board 500U, and the second main circuit board 500L is discharged through the heat discharging member 300.

As shown in FIG. 3, the heat discharging member 300 includes a first surface 300-S1 facing the light source 150, a second surface 300-S2 extending from the first surface 300-S1, and a third surface 300-S3 extending from the first surface 300-S1. Each of the second and third surfaces 300-S2 and 300-S3 extends from the first surface 300-S1 at a predetermined angle with respect to the first surface 300-S1. In the exemplary embodiment shown in FIG. 3, the second surface 300-S2 and the third surface 300-S3 are disposed on different planes from each other.

The first surface 300-S1 is substantially parallel to the incident surface 130, and the second and third surfaces 300-S2 and 300-S3 are substantially parallel to the first and second exiting surfaces 110 and 120.

The light source 150 is mounted on the first surface 300-S1 of the heat discharging member 300, the first main circuit board 500U is mounted on the second surface 300-S2 of the heat discharging member 300, and the second main circuit board 500L is mounted on the third surface 300-S3 of the heat discharging member 300.

The light source circuit board 154 is mounted on the first surface 300-S1. A heat-transmitting adhesive member TAS may be disposed between the first surface 300-S1 and the light source circuit board 154. An opposing side of the light source circuit board 154 faces the surface on which the light emitting device 152 is disposed.

The heat-transmitting adhesive member TAS includes an adhesive component and a heat-conductive medium such as, for example, metal, ceramic, a heat-conductive filler, or a polymer coated with metal. The adhesive component attaches the light source circuit board 154 to the heat discharging member 300, and the heat-conductive medium transmits the heat generated from the light source 150 to the heat discharge member 300.

Hereinafter, the heat discharging member 300 shown in FIG. 3 will be described in further detail with reference to FIGS. 4A to 4C. The shape of the heat discharging member 300 is not limited to the shape shown in FIGS. 4A to 4C. For example, the heat discharging member 300 may include various shapes having the first surface 300-S1, the second surface 300-S2, and the third surface 300-S3.

Figure 4A:
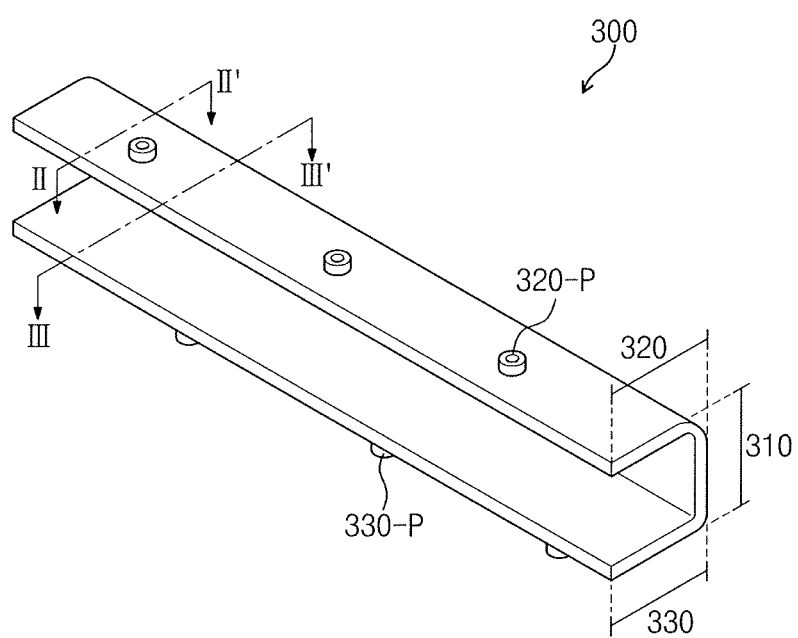
FIG. 4A is a perspective view showing a heat discharging member shown in FIG. 1, according to an exemplary embodiment of the present invention.

FIG. 4A is a perspective view showing the heat discharging member shown in FIG. 1, according to an exemplary embodiment. FIG. 4B is a cross-sectional view taken along line II-II' of FIG. 4A, according to an exemplary embodiment. FIG. 4C is a cross-sectional view taken along line of FIG. 4A, according to an exemplary embodiment.

Referring to FIG. 4A, the heat discharging member 300 includes a vertical portion 310, a first horizontal portion 320, and a second horizontal portion 330. The vertical portion 310 includes the first surface 300-S1 of the heat discharging member. The first horizontal portion 320 extends from the vertical portion 310 and includes the second surface 300-S2 of the heat discharging member. The second horizontal portion 330 extends from the vertical portion 310 and includes the third surface 300-S3 of the heat discharging member.

Each of the vertical portion 310, the first horizontal portion 320, and the second horizontal portion 330 extends in the horizontal direction D2. The first horizontal portion 320 and the second horizontal portion 330 are spaced apart from each other and face each other. Thus, as shown in FIG. 4A, the heat discharging member 300 may be substantially U-shaped.

In an exemplary embodiment, the heat discharging member 300 may further include another vertical portion that connects the first and second horizontal portions 320 and 330 and faces the vertical portion 310. Thus, in an exemplary embodiment, the heat discharging member 300 may be substantially O-shaped.

The heat discharging member 300 according to exemplary embodiments of the present invention is capable of discharging generated heat in a plurality of directions. For example, heat transmitted to the first surface 300-S1, the second surface 300-S2, and the third surface 300-S3 may be discharged through a fourth surface 300-S4, a fifth surface 300-S5, and a sixth surface 300-S6, which respectively face the first surface 300-S1, the second surface 300-S2, and the third surface 300-S3, as shown in FIG. 4B.

Discharging generated heat in various directions, as shown in FIG. 4A, may improve the heat discharging efficiency of a liquid crystal display. In addition, disposing the vertical portion 310, the first horizontal portion 320, and the second horizontal portion 330 on different planes from each other may reduce the space within a liquid crystal display occupied by the heat discharging member 300.

Figure 4B:
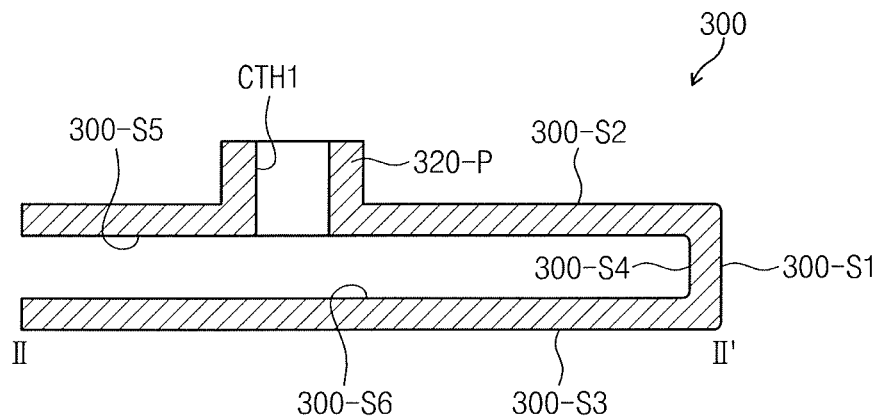
FIG. 4B is a cross-sectional view taken along line II-II' of FIG. 4A.
Figure 4C:
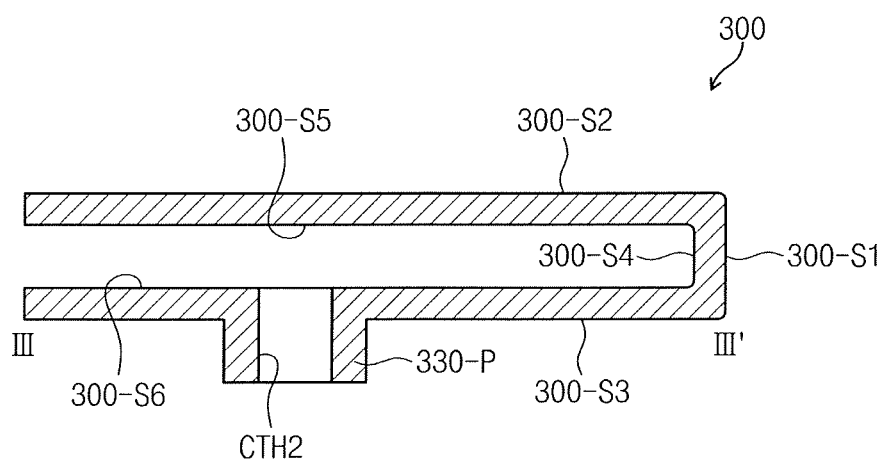
FIG. 4C is a cross-sectional view taken along line of FIG. 4A.

As shown in FIGS. 4A to 4C, the first horizontal portion 320 may include at least one protruding portion 320-P protruding from the second surface 300-S2, and the second horizontal portion 330 may include at least one protruding portion 330-P protruding from the third surface 300-S3.

The first horizontal portion 320 includes a first coupling hole CTH1 penetrating through the first protruding portion 320-P in a longitudinal direction, and the second horizontal portion 330 includes a second coupling hole CTH2 penetrating through the second protruding portion 330-P in a longitudinal direction.

According to an exemplary embodiment, the first protruding portion 320-P and the second protruding portion 330-P may be substantially aligned with each other. In addition, in exemplary embodiments, one or both of the first and second protruding portions 320-P and 330-P and/or the first and second coupling holes CTH1 and CTH2 may not be included.

As shown in FIG. 3, the first protruding portion 320-P may be utilized to fix the first main circuit board 500U to the first horizontal portion 320 of the heat discharging member 300. Similarly, the second protruding portion 330-P may be utilized to fix the second main circuit board 500L to the second horizontal portion 330 of the heat discharging member 300.

Each of the first and second main circuit boards 500U and 500L includes at least one through-hole 500-TH. The first protruding portion 320-P is inserted into a first through-hole 500-TH of the first main circuit board 500U, and the second protruding portion 330-P is inserted into a first through-hole of the second main circuit board 500L.

The heat discharging member 300 may be fixed to the first protective member 700U. The first protective member 700U includes a third coupling hole CTH3 formed in the second region 700-R2. The third coupling hole CTH3 is formed at a position corresponding to the first coupling hole CTH1. In an exemplary embodiment that includes a heat discharging member 300 that is not fixed to the first protective member 700U, the third coupling hole CTH3 may not be included.

A fixing member 800 is inserted into the third coupling hole CTH3 and the first coupling hole CTH1, as shown in FIG. 3. The fixing member 800 may be, for example, a bolt that includes a head portion and a body portion. The body portion of the fixing member 800 is inserted into the third coupling hole CTH3 and the first coupling hole CTH1, and the head portion is disposed on the first protective member 700U and is exposed. A screw thread and a screw valley may be formed on an inner surface of the first coupling hole CTH1, which respectively correspond to a screw valley and a screw thread formed on the body portion of the bolt.

The shape of the inner surface of the first coupling hole CTH1 may be varied depending on the type of bolt used. For example, if the fixing member 800 is a stud bolt, a catching protrusion may be formed on the inner surface of the first coupling hole CTH1.

In an exemplary embodiment, the inner surface of the first coupling hole CTH1 does not include a screw head and a screw valley, and the fixing member 800 may include a bolt and a nut.

Figure 5A:
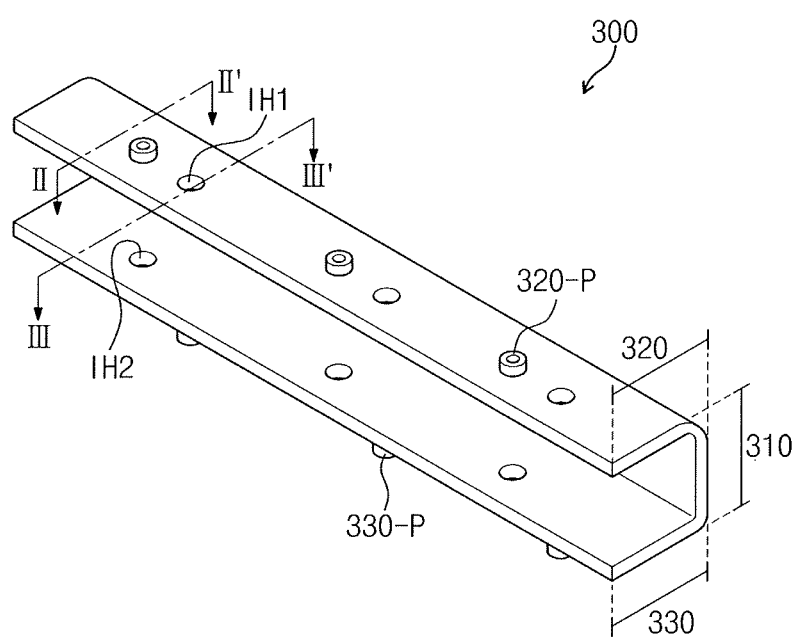
FIG. 5A is a perspective view showing a heat discharging member shown in FIG. 1, according to an exemplary embodiment of the present invention.
Figure 5B:
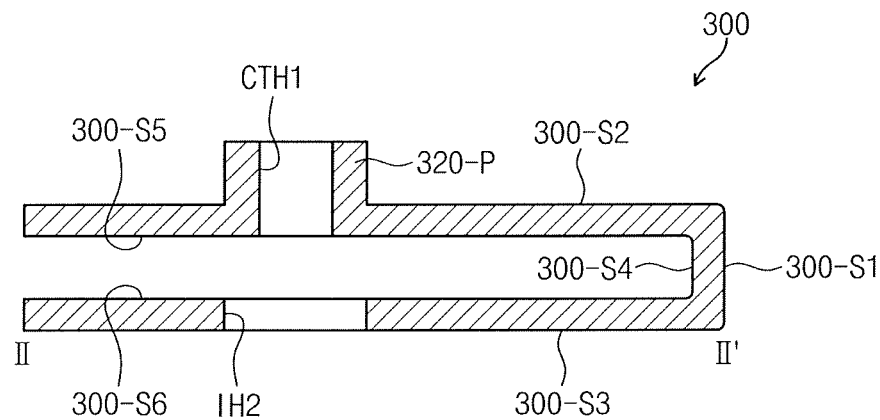
FIG. 5B is a cross-sectional view taken along line II-II' of FIG. 5A.
Figure 5C:
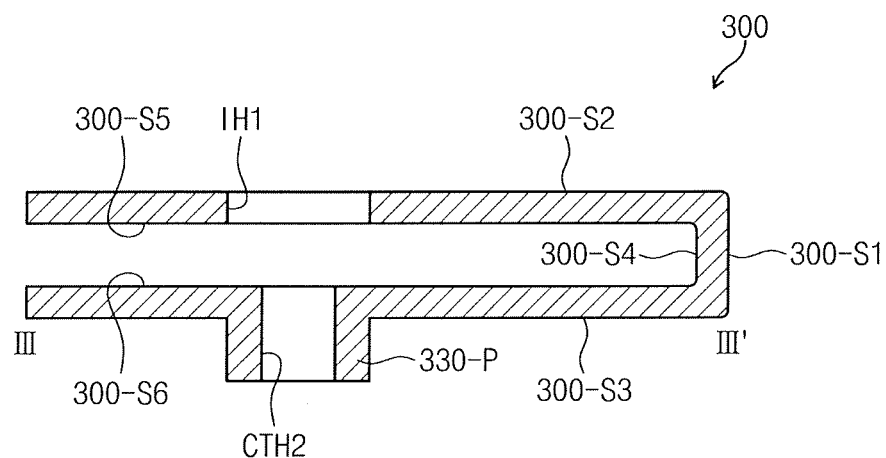
FIG. 5C is a cross-sectional view taken along line of FIG. 5A.

FIG. 5A is a perspective view showing a heat discharging member shown in FIG. 1, according to an exemplary embodiment of the present invention. FIG. 5B is a cross-sectional view taken along line II-II' of FIG. 5A. FIG. 5C is a cross-sectional view taken along line of FIG. 5A. The fixing member 800 may include a stud bolt and a stud nut. The first horizontal portion 320 includes at least one first insert hole IH1 penetrating through a part of the first horizontal portion 320, and the second horizontal portion 330 includes at least one second insert hole IH2 penetrating through a part of the second horizontal portion 330.

The at least one first insert hole IH1 is formed at a position corresponding to the at least one second protruding portion 330-P, and the at least one second insert hole IH2 is formed at a position corresponding to the at least one first protruding portion 320-P.

The stud nut may be inserted into the first coupling hole CTH1 passing through the corresponding second insert hole IH2. The stud nut may be inserted into the second coupling hole CTH2 passing through the corresponding first insert hole IH1. The stud bolt is combined with the stud nut inserted into the first coupling hole CTH1 or the second coupling hole CTH2.

The heat discharging member 300 may be fixed to the second protective member 700L in a similar manner as described above. The second protective member 700L further includes a fourth coupling hole CTH4 formed in the second region 700-R2 (refer to FIG. 1), and the fixing member 800 is inserted into the fourth coupling hole CTH4 and the second coupling hole CTH2 (refer to FIG. 4C).

Figure 6:
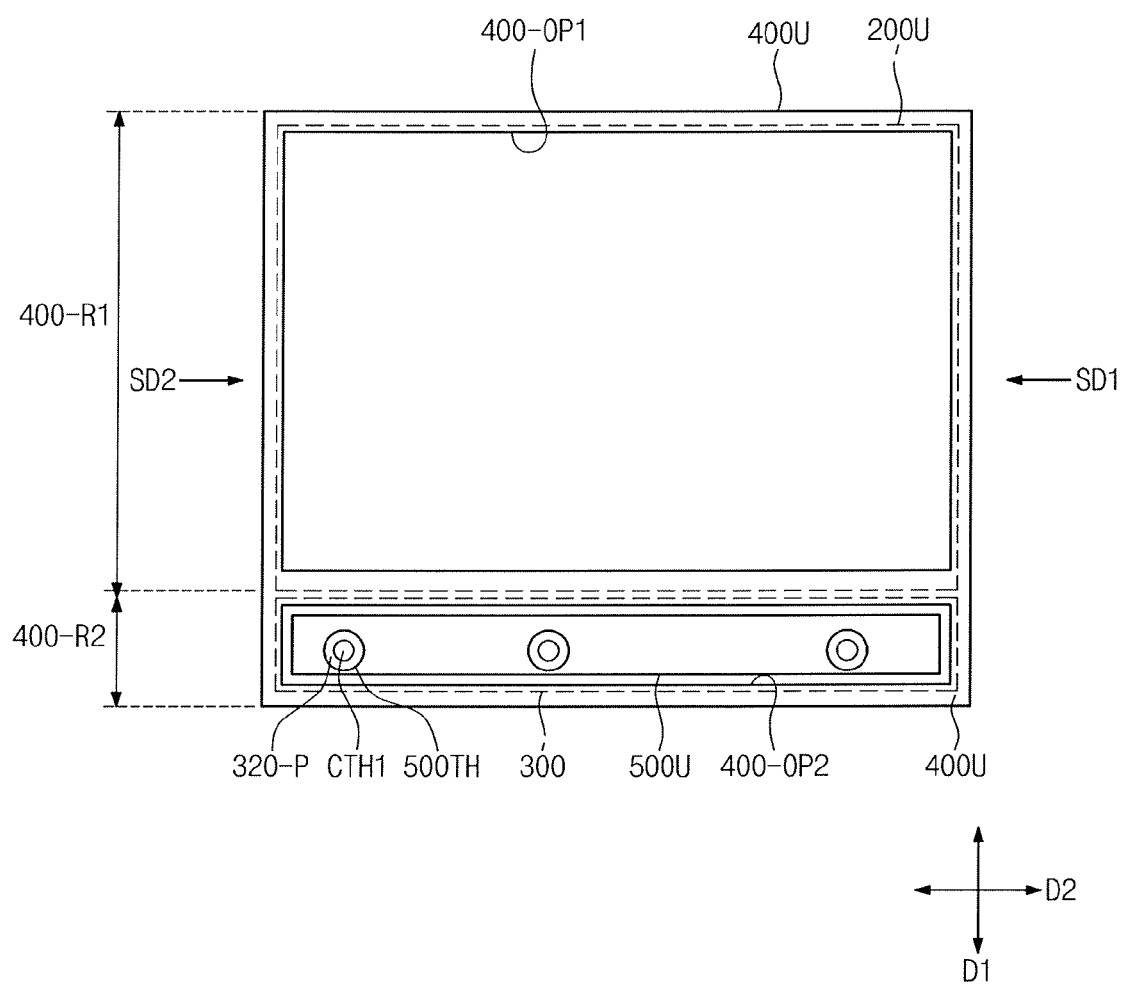
FIG. 6 is a top view showing the liquid crystal display having its protective frame is removed, according to an exemplary embodiment of the present invention.
Figure 7A:
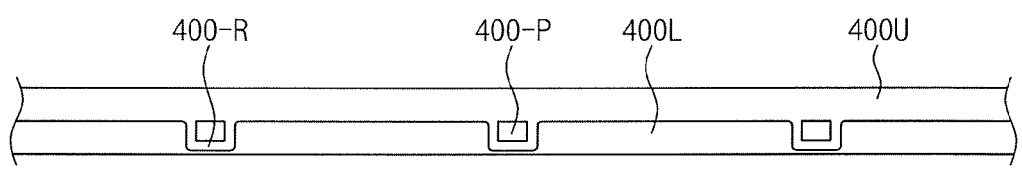
FIGS. 7A and 7B are side views showing the liquid crystal display shown in FIG. 6, according to an exemplary embodiment of the present invention.
Figure 7B:
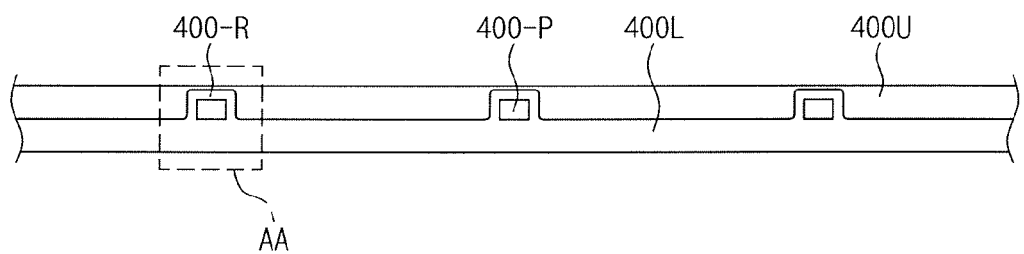

FIG. 6 is a top view showing the liquid crystal display having its protective frame removed, according to an exemplary embodiment. FIGS. 7A and 7B are side views showing the liquid crystal display shown in FIG. 6, according to an exemplary embodiment.

As described with reference to FIGS. 1 to 3, the supporting frame includes the first supporting member 400U and the second supporting member 400L.

FIG. 6 shows the first supporting member 400U, the first optical member 200U, the heat discharging member 300, and the first main circuit board 500U, according to an exemplary embodiment. An edge portion of the first optical member 200U and an edge portion of the heat discharging member 300 are indicated by dotted lines.

The first supporting member 400U includes a first region 400-R1 that covers a portion of the first optical member 200U, and a second region 400-R2 that covers a portion of the heat discharging member 300. When the first optical member 200U is omitted, the first region 400-R1 of the first supporting member 400U covers a portion of the light guide plate 100.

For example, the first region 400-R1 of the first supporting member 400U covers the edge portion of the first optical member 200U, and the second region 400-R2 of the first supporting member 400U covers the edge portion of the heat discharging member 300.

A second opening 400-OP1 is positioned in the first region 400-R1 of the first supporting member 400U, and a third opening 400-OP2 is positioned in the second region 400-R2 of the first supporting member 400U.

In an exemplary embodiment, the second supporting member 400L has substantially the same shape as that of the first supporting member 400U as shown in FIG. 6. That is, the second supporting member 400L includes a first region 400-R1 that covers a portion of the second optical member 200L (refer to FIG. 3), and a second region 400-R2 that covers a portion of the heat discharging member 300.

Referring to FIGS. 7A and 7B, the first supporting member 400U and the second supporting member 400L are coupled to each other. FIG. 7A shows side surface SD1 of the supporting frame shown in FIG. 6, and FIG. 7B shows an opposing side surface SD2 facing the side surface SD1 shown in FIG. 7A.

As shown in FIGS. 7A and 7B, each of the first supporting member 400U and the second supporting member 400L includes a plurality of ring-shaped portions 400-R and a plurality of catching portions 400-P.

In an exemplary embodiment, ring-shaped portions 400-R are formed on side surface SD1 of the first supporting member 400U, and corresponding catching portions 400-P are formed on side surface SD1 of the second supporting member 400L. The ring-shaped portions 400-R formed on side surface SD1 are respectively caught by the catching portions 400-P of the second supporting member 400L.

Further, catching portions 400-P are also formed on the opposing side surface SD2 of the first supporting member 400U, and corresponding ring-shaped portions 400-R are formed on the other side surface SD2 of the second supporting member 400L. The ring-shaped portions 400-R disposed on the other side surface SD2 of the second supporting member 400L engage the catching portions 400-P of the first supporting member 400U.

Figure 8:
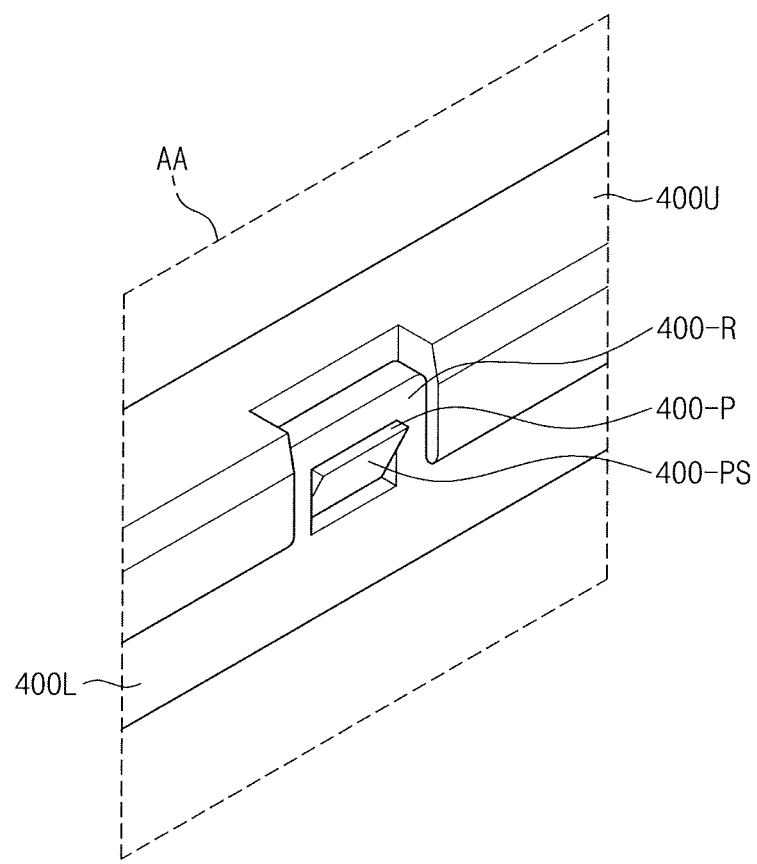
FIG. 8 is a partially enlarged view showing a portion of the liquid crystal display shown in FIG. 7B, according to an exemplary embodiment of the present invention.

FIG. 8 is a partially enlarged view showing a portion of the liquid crystal display shown in FIG. 7B, according to an exemplary embodiment. The portion of the liquid crystal display shown corresponds to area AA shown in FIG. 7B. As shown in FIG. 8, each of the catching portions 400-P includes at least one inclined surface 400-PS. Each of the ring-shaped portions 400R slides along the inclined surface 400-PS of a corresponding catching portion of the catching portions 400-P, and each of the catching portions 400-P is coupled to a corresponding ring-shaped portion of the ring-shaped portions 400R.

The shape of the second supporting member 400L is substantially the same as the shape of the first supporting member 400U when the first supporting member 400U is overturned (e.g., upside down). The supporting frame is formed by coupling the second supporting member 400L and the overturned first supporting member 400U. Forming a plurality of supporting members having substantially the same shape may reduce the manufacturing cost of the supporting members.

One of two side surfaces of the supporting frame shown in FIG. 6, which are not shown in FIGS. 7A and 7B, has substantially the same shape as the side surface SD1, and the other one of the two side surfaces has substantially the same shape as the other side surface SD2.

While the present invention has been particularly shown and described with reference to the exemplary embodiments thereof, it will be understood by those of ordinary skill in the art that various changes in form and detail may be made therein without departing from the spirit and scope of the present invention as defined by the following claims.

What is claimed is:

1. A liquid crystal display, comprising:
   a light guide plate comprising a first exiting surface and a second exiting surface facing the first exiting surface, and a side surface extending from the first exiting surface to the second exiting surface;
   a light source facing the side surface, and configured to provide light to the side surface;
   a first liquid crystal display panel configured to receive the light exiting from the first exiting surface;
   a second liquid crystal display panel configured to receive the light exiting from the second exiting surface;
   a heat discharging member configured to discharge heat generated by the light source; and
   a first main circuit board configured to apply an electrical signal to at least one of the first liquid crystal display panel and the second liquid crystal display panel,
   wherein the light source and the first main circuit board are mounted on the heat discharging member.

2. The liquid crystal display of claim 1, further comprising:
   a second main circuit board mounted on the heat discharging member,
   wherein the first main circuit board is configured to apply a first electrical signal to the first liquid crystal display panel, and the second main circuit board is configured to apply a second electrical signal to the second liquid crystal display panel.

3. The liquid crystal display of claim 2, wherein the heat discharging member comprises a first surface facing the light source, a second surface extending from the first surface in a first plane, and a third surface extending from the first surface in a second plane substantially parallel to the first plane,
   wherein the light source is mounted on the first surface, the first main circuit board is mounted on the second surface, and the second main circuit board is mounted on the third surface.

4. The liquid crystal display of claim 3, wherein the first surface is substantially parallel to the side surface, and the second and third surfaces are substantially parallel to the first and second exiting surfaces.

5. The liquid crystal display of claim 3, wherein the light source comprises a light source circuit board on which a plurality of light emitting devices are mounted, and the light source circuit board is mounted on the first surface.

6. The liquid crystal display of claim 5, further comprising a heat-conductive adhesive member disposed between the first surface and the light source circuit board,
   wherein the heat discharging member and the light source circuit board are attached to each other by the heat-conductive adhesive member, and the heat-conductive adhesive member is configured to transmit heat generated by the light source circuit board to the heat discharging member.

7. The liquid crystal display of claim 3, wherein the heat discharging member comprises a vertical portion comprising the first surface, a first horizontal portion extending from the vertical portion and comprising the second surface, and a second horizontal portion extending from the vertical portion and comprising the third surface.

8. The liquid crystal display of claim 7, wherein the first horizontal portion and the second horizontal portion are spaced apart from each other and face each other.

9. The liquid crystal display of claim 7, further comprising:
   a first protective member comprising a first region covering a portion of the first liquid crystal display panel, and a second region covering the first main circuit board; and
   a second protective member comprising a first region covering a portion of the second liquid crystal display panel, and a second region covering the second main circuit board, wherein the second protective member is coupled to the first protective member.

10. The liquid crystal display of claim 9, wherein each of the first main circuit board and the second main circuit board comprises at least one through-hole, and
    the heat discharging member further comprises at least one first protruding portion inserted into the at least one through-hole of the first main circuit board, and at least one second protruding portion inserted into the at least one through-hole of the second main circuit board.

11. The liquid crystal display of claim 10, wherein the heat discharging member comprises a first coupling hole penetrating the first protruding portion and a second coupling hole penetrating the second protruding portion,
    the first protective member further comprises a third coupling hole formed in the second region of the first protective member and corresponding to the first coupling hole, and
    the second protective member further comprises a fourth coupling hole formed in the second region of the second protective member and corresponding to the second coupling hole.

12. The liquid crystal display of claim 10, wherein the heat discharging member further comprises at least one first insert hole penetrating a part of the first horizontal portion, the at least one first insert hole being formed at a position corresponding to the at least one second protruding portion, and at least one second insert hole penetrating a part of the second horizontal portion, the at least one second insert hole being formed at a position corresponding to the at least one first protruding portion.

13. The liquid crystal display of claim 11, further comprising a fixing member fixing the heat discharging member to one of the first protective member or the second protective member,
    wherein the fixing member is inserted into the third coupling hole and the first coupling hole, or into the fourth coupling hole and the second coupling hole.

14. The liquid crystal display of claim 3, further comprising:
    a first supporting member covering a portion of the first exiting surface and a portion of the second surface; and
    a second supporting member covering a portion of the second exiting surface and a portion of the third surface, wherein the first supporting member is coupled to the second supporting member.

15. The liquid crystal display of claim 14, wherein each of the first supporting member and the second supporting member comprises a plurality of ring-shaped portions and a plurality of catching portions,
- the ring-shaped portions of the first supporting member are configured to engage the catching portions of the second supporting member, and
- the ring-shaped portions of the second supporting member are configured to engage the catching portions of the first supporting member.

16. The liquid crystal display of claim 15, wherein the first supporting member and the second supporting member are a substantially same shape.

17. A liquid crystal display, comprising:
- a light source configured to emit light;
- a light guide plate comprising a first exiting surface and a second exiting surface, and configured to output the light through the first exiting surface and the second exiting surface;
- a first liquid crystal display panel facing the first exiting surface;
- a second liquid crystal display panel facing the second exiting surface, wherein the light guide plate is disposed between the first and second liquid crystal display panels;
- a main circuit board configured to apply an electrical signal to the first and second liquid crystal display panels;
- a heat discharging member configured to discharge heat generated by the light source and the main circuit board, wherein the light source and the main circuit board are mounted on the heat discharging member;
- a supporting frame covering a portion of the light guide plate and a portion of the heat discharging member, and supporting the first liquid crystal display panel and the second liquid crystal display panel; and
- a protective frame configured to accommodate the first liquid crystal display panel, the second liquid crystal display panel, and the supporting frame.

18. The liquid crystal display of claim 17, wherein the heat discharging member comprises a first portion and a second portion extending from the first portion,
- wherein the light source is mounted on the first portion, and the main circuit board is mounted on the second portion.

19. The liquid crystal display of claim 18, wherein the main circuit board is a first of two main circuit boards, the second portion of the heat discharging member is a first of two second portions, the two main circuit boards are respectively mounted on the two second portions, and the two second portions are spaced apart from each other and face each other.

20. The liquid crystal display of claim 17, wherein the supporting frame comprises a first supporting member comprising a first region covering a portion of the first exiting surface and a second region covering a portion of the heat discharging member, and a second supporting member comprising a first region covering a portion of the second exiting surface and a second region covering a portion of the heat discharging member,
- the first supporting member is coupled to the second supporting member, and
- the heat discharging member is fixed between the second region of the first supporting member and the second region of the second supporting member.

21. The liquid crystal display of claim 20, further comprising:
- a first optical sheet disposed between the first region of the first supporting member and the first exiting surface; and
- a second optical sheet disposed between the first region of the second supporting member and the second exiting surface.

22. A liquid crystal display, comprising:
- a light guide plate comprising a first exiting surface and a second exiting surface facing the first exiting surface, and a side surface extending from the first exiting surface to the second exiting surface;
- a light source facing the side surface, and configured to provide light to the side surface;
- a first liquid crystal display panel configured to receive the light exiting from the first exiting surface;
- a second liquid crystal display panel configured to receive the light exiting from the second exiting surface;
- a first supporting member covering a portion of the first exiting surface; and
- a second supporting member covering a portion of the second exiting surface, the second supporting member being coupled to the first supporting member,
- wherein each of the first supporting member and the second supporting member comprises a plurality of ring-shaped portions and a plurality of catching portions,
- the ring-shaped portions of the first supporting member are configured to engage the catching portions of the second supporting member, and
- the ring-shaped portions of the second supporting member are configured to engage the catching portions of the first supporting member.

23. The liquid crystal display of claim 22, wherein the first supporting member and the second supporting member are a substantially same shape.

* * * * *